United States Patent [19]

Opoku

[11] 3,998,702
[45] Dec. 21, 1976

[54] APPARATUS FOR PROCESSING BITUMINOUS FROTH

[75] Inventor: Sam Kwame Opoku, Fort McMurray, Canada

[73] Assignee: Great Canadian Oil Sands Limited, Canada

[22] Filed: Oct. 14, 1975

[21] Appl. No.: 622,312

[52] U.S. Cl. .......... 196/14.52; 208/11 LE; 261/123

[51] Int. Cl.² .......... B01D 11/00

[58] Field of Search ...... 23/267 MS, 270 R, 271 R; 196/14.52; 261/123, 124; 208/11 R, 11 LE

[56] References Cited

UNITED STATES PATENTS

| 3,159,562 | 12/1964 | Bichard et al. ........... 196/14.52 X |
| 3,231,252 | 1/1966 | Reed .................... 261/123 |
| 3,555,786 | 1/1971 | Cochran ................. 261/124 X |
| 3,607,104 | 9/1971 | Blickle et al. ........... 23/270 R X |

FOREIGN PATENTS OR APPLICATIONS

| 638,415 | 3/1962 | Canada ............. 208/11 LE |
| 882,667 | 10/1971 | Canada |

Primary Examiner—Morris O. Wolk
Assistant Examiner—Arnold Turk
Attorney, Agent, or Firm—J. Edward Hess; Donald R. Johnson; Gary V. Pack

[57] ABSTRACT

An apparatus in which bituminous froth is concurrently heated and deaerated while flowing by gravity from one zone to another.

11 Claims, 4 Drawing Figures

APPARATUS FOR PROCESSING BITUMINOUS FROTH

BACKGROUND OF THE INVENTION

The present invention relates to an apparatus suitable for transferring bituminous froth recovered from a hot water process for recovering bitumen from tar sands.

Tar sands, which are also known as oil and bituminous sands, are siliceous materials which are impregnated with a heavy petroleum. The largest and most important deposits of the sands are the Athabasca sands, found in northern Alberta, Canada. These sands underlay more than 13,000 square miles at a depth of 0 to 2,000 feet. Total recoverable reserves after extraction and processing are estimated at more than 300 billion barrels. Tar sands are primarily silica, having closely associated therewith an oil film which varies from about 5 to 21% by weight, with a typical content of 13 weight percent of the sand. The oil is quite viscous — 6° to 10° API gravity — and contains typically 4.5% sulfur and 38% aromatics. In addition to the oil and sand components, tar sands contain clay and silt in quantities of 1 to 10% by weight, in the form of a film around the sand grains.

Several basic extraction methods have been known for many years for the separation of oil from the sands. In the so-called "cold water" method, the separation is accomplished by mixing the sands with a solvent capable of dissolving the bitumen constituent. The mixture is then introduced into a large volume of water, water with a surface agent added, or a solution of a neutral salt in water, which salt is capable of acting as an electrolyte. The combined mass is then subjected to a pressure or gravity separation.

In the hot water method, as disclosed in Canadian Pat. No. 841,581 issued May 12, 1970, the bituminous sands are jetted with steam and mulled with a minor amount of hot water at temperatures of 170° to 190° F, and the resulting pulp is then dropped into a turbulent stream of circulating hot water and carried to a separation cell maintained at a temperature of about 185° F. In the separation cell, sand settles to the bottom as tailings and oil rises to the top in the form of a froth. An aqueous middlings layer comprising clay and silt and some oil is formed between these layers. This basic process may be combined with a scavenger step for further treatment of the middlings layer obtained from the primary separation step to recover additional amounts of oil therefrom.

The bituminous froth produced by this process is recovered at a temperature in the range of about 140° to 180° F and normally has a specific gravity in the range of 0.85 to 0.95. Generally, the froth contains 30 to 70 weight percent air.

In recovering bituminous froth utilizing the process disclosed in Canadian Pat. No. 841,581 and the hot water separation cell disclosed in Canadian Pat. No. 882,667 issued Oct. 5, 1971, the froth is recovered in overflow launders disposed on the upper edge of the extraction cell. Thereafter, the froth flows by gravity into a collection vessel located near the separation cell below the level of the froth collection launders. Often, one collection vessel serves four or more separation cells at the same time to provide a central collection means for recovered froth. Froth from secondary scavenger steps as disclosed in the above-noted hot water process can also be collected in this same vessel. Thereafter, the froth is heated and transferred to a centrifuge zone or other means of demineralizing and dehydration. Normally, the froth is diluted with a liquid hydrocarbon before the demineralization and dehydration steps. Methods of accomplishing water and mineral removal from the froth are disclosed in Canadian Pat. Nos. 910,271 issued Sept. 19, 1972 and 918,091 issued Jan. 2, 1973.

The bituminous froth as recovered from the hot water extraction cell resembles a liquid foam with poor flow characteristics. The froth is difficult to pump and therefore must be treated to improve its liquid flow characteristics if it is to be processed in a reasonable manner. Canadian Pat. No. 630,710 issued Nov. 7, 1961 discloses that bituminous froth can be collected and transferred to a deaeration zone where it is heated with steam at subatmospheric pressures to remove air bubbles from the froth. This end can be accomplished by adding the froth to a steam heated oil bath maintained at subatmospheric pressure. The froth is therein diluted with oil and agitated to remove air bubbles from the froth. Although this method improves the froth, transferring the froth to the treatment apparatus disclosed nevertheless renders the process cumbersome. By the method of the present invention the processing of bituminous froth is improved.

DESCRIPTION OF THE INVENTION

The present invention relates to a method and apparatus for upgrading bituminous froth recovered via hot water extraction of tar sands. Specifically, it has been discovered that collecting bituminous froth in a novel collection apparatus affixed to a hot water extraction separation cell provides bituminous froth with substantially improved flow properties and pumping characteristics.

Specifically, the apparatus of the present invention comprises an improved hot water extraction separation cell launder which contains a plurality of steam injection means disposed therein for concurrently heating and deaerating the bituminous froth as it is collected in the launder prior to being further processed. Also, the present invention comprises a gravity flow conduit in which bituminous froth can be heated and deaerated while being transferred from a separation cell to a collection zone.

As one means of defining this invention the figures in the drawings are provided. In FIG. 1, a hot water process extraction scheme including one mode of the gravity flow conduit apparatus of the present invention is illustrated.

Figure 3:
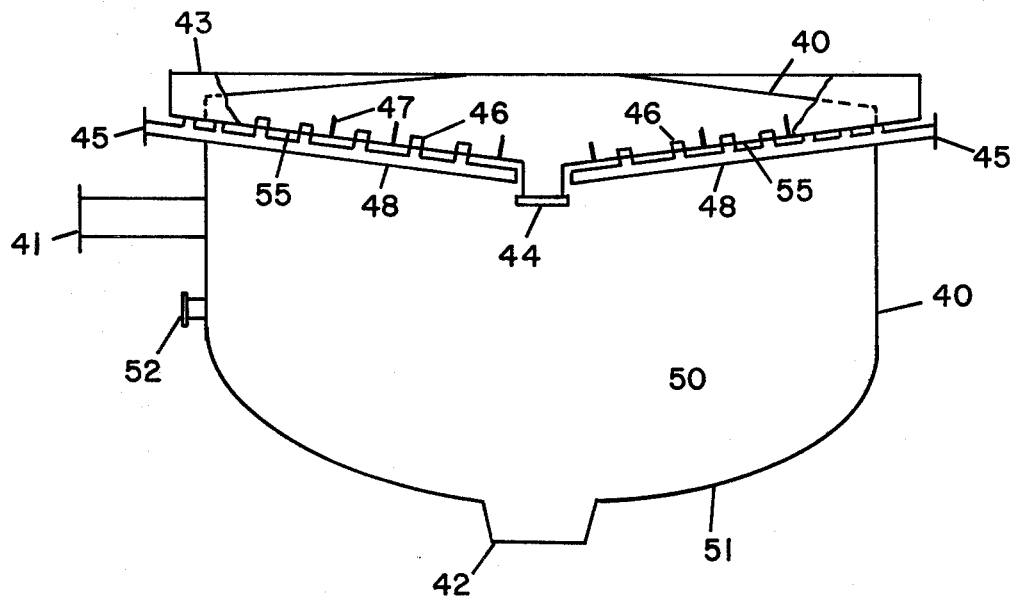
FIG. 3 is a view of a hot water extraction cell including the novel froth deaerating launder of the present invention.
Figure 4:
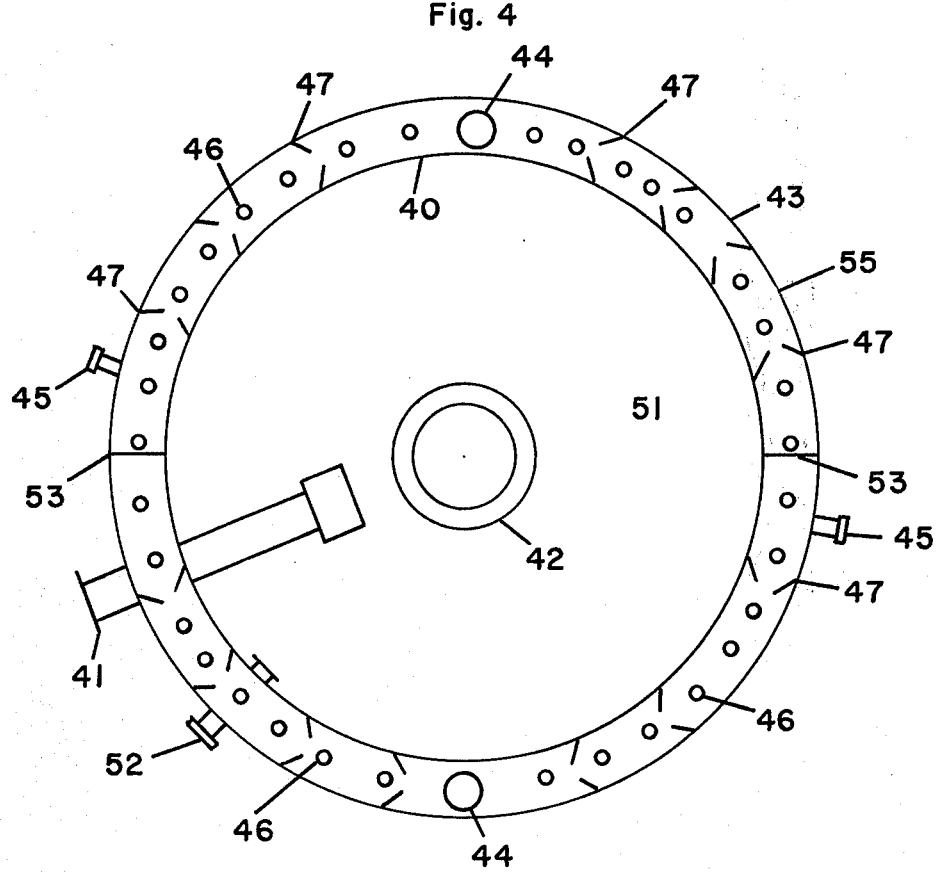

FIG. 4 provides a top view of the same cell as shown in FIG. 3.

Figure 1:
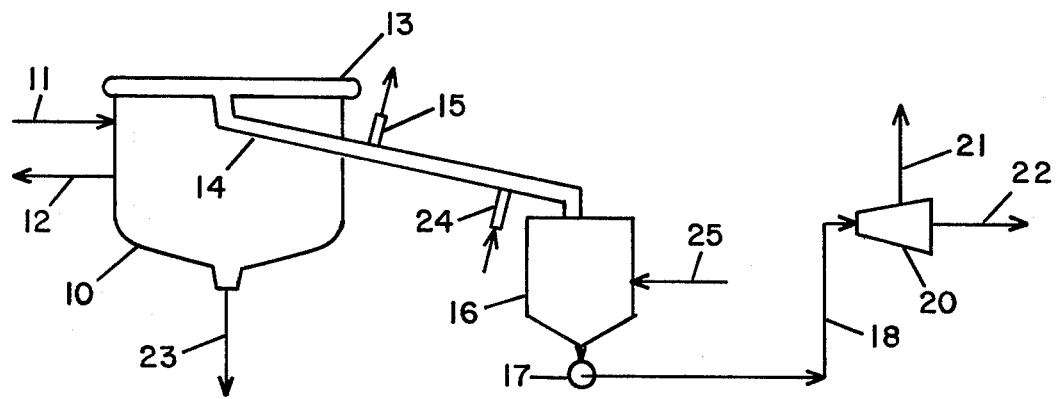

Referring to the illustration in FIG. 1, tar sands pulp is fed into hot water extraction separation cell 10 via line 11. In the cell an upper froth layer, a middlings layer, and a sand tailings layer are formed. The sand tailings layer is withdrawn from cell 10 via line 23. A middlings stream can be withdrawn from cell 10 via line 12 and the upper froth layer can overflow into launder 13 located on the upper edge and adjacent to the separation cell from which the froth can be recovered. This launder can be a standard launder known to the art or the novel launder illustrated in FIGS. 3 and 4. Conduit 14 can be the novel gravity flow deaerating conduit (14') of the present invention having an upper inlet communicating with launder 13 for receiving froth therefrom and a lower outlet communicating with collection vessel 16 for discharging froth thereto. Conduit 14 has exit means 15 for withdrawing or venting air and steam and inlet means 24 for addition of steam. Conduit 14 as shown is disposed on an angle from the horizontal to thereby facilitate gravity flow of liquids therethrough. The apparatus illustrated in FIG. 1 can contain the improved launder herein disclosed and illustrated in FIGS. 3 and 4 alone or in combination with the conduit 14 illustrated in FIG. 2. Alternatively the conduit 14 illustrated in detail in FIG. 2 can be used as a part of the apparatus illustrated in FIG. 1 without the improved launder of FIGS. 3 and 4. The combination of the improved launder and conduit provides sufficient steam-froth contact time to more than adequately heat and deaerate the froth at average froth recovery rates. Heated and deaerated froth from one or more separation cells can be combined in collection vessel 16 and diluted with a liquid hydrocarbon diluent when desired.

Liquid hydrocarbon diluent can be added to collection vessel 16 via line 25. Pumping means 17 is located at a bottom outlet in collection vessel 16 which permits pumping the heated diluted, deaerated froth via line 18 to a centrifuge zone 20 or other processing means. Minerals and water from the bituminous froth can be removed from centrifuge zone 20 via line 22. Refined bitumen can be recovered via line 21 from centrifuge zone 20.

Figure 2:
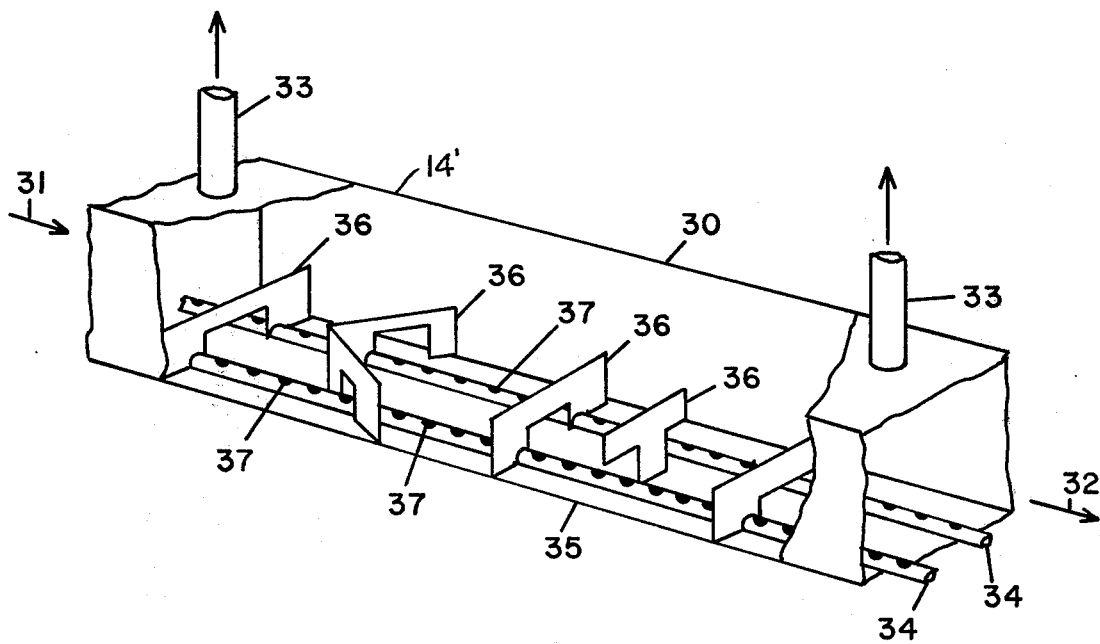
FIG. 2 is an illustration of one section of the deaerating conduit mode of the apparatus of the present invention.

The drawing in FIG. 2 provides a detailed illustration of one mode of the apparatus of the present invention. Referring to FIG. 2, deaerating conduit 14' is shown as a section 30 which can be a section out of conduit 14 of FIG. 1, having an inlet opening 31 and exit opening 32. The lower or bottom zone of the conduit has steam injection means 34 which can be one or more pipes having a plurality of openings or nozzles 37 disposed over the upper surface thereof. Also disposed along the surface of the lower zone of the conduit are deflection baffles 36. Disposed in the top of conduit section 30 is exit means 33 which permits steam and air to separately vent from the conduit.

Although illustrated as a square channel the conduit can be round or any other shape which is effective to permit gravity flow of a liquid from the upper inlet to the lower outlet end. The conduit is always disposed at an angle from the horizontal axis normally in the range of 5° to 45° to facilitate gravity flow of bituminous froth through the conduit at the desired rate. The amount of deaeration as well as heat transfer acomplished in the conduit is dependent upon the temperature and relative quantity of steam passing through the froth as well as the amount of agitation resulting from the froth contact with the baffles in the conduit.

FIG. 2 provides an illustration of some of the various sizes and shapes of baffles suitable for use in the apparatus of the present invention. The only critical limitation to the structure of the baffle is that it extends over less thant 100% of the bottom surface of the conduit. At least a part of the bottom of the conduit must remain open over the length thereof. These openings in the baffles are necessary to provide a continuous channel from the inlet means of the conduit to the outlet means thereof, thereby facilitating free gravity flow of the bitumen froth therethrough.

The angular position of the conduit and the quantity and volume of steam added to the conduit are regulated to provide the maximum efficiency in heating and deaerating the froth. These requirements of course are dependent in part on the temperature and quantity of air in the froth feed. Also the number, size and positioning of baffles in the conduit effect froth flow and thereby affect deaeration and heating of the froth. The conduit can be fully or partially open at the top as well as fully enclosed with vapor exit means as illustrated in FIG. 2.

Another mode of the improved apparatus of the present invention is provided in the separation cell illustrated in FIGS. 3 and 4. Referring to the drawing in FIG. 3 a hot water extraction separation cell is comprised of a tank 50 (generally referred to in FIG. 1 by the numeral 10) having vertical wall 40 and a concave bottom 51 having a tailings discharge outlet 42 located at the lowest point in the bottom. Tar sands feed inlet 41 is located on the vertical wall as well as middlings outlet 52, both of which communicate with the inner cavity of the cell. Located on the upper end of the cell wall and affixed to the outer side thereof is the novel launder 43 (generally referred to in FIG. 1 by the numeral 13). This launder is another mode of the apparatus of the present invention. The bottom of the launder 55 is disposed at an angle to the horizontal axis and contains outlets 44 in the two lowest portions of the launder located on opposite sides of the cell. The launder also has a plurality of baffles 47 distributed intermittently along the bottom as well as a plurality steam injection means 46 which communicate with steam conduit 48 via inlet means 45. The launder in essence is provided in two halves around the perimeter of the upper edge of the cell.

Another view of the same cell is illustrated in FIG. 4 which is seen looking down on the cell of FIG. 3 from the top. Cell wall 40 is affixed to cell bottom 51 which contains exit means 42. Tar sand inlet 41 and middlings withdrawal means 52 are also provided. Bitumen froth recovery launder 43 having oultets 44 and also containing deflection baffles 47 and steam injection outlets 46 is also shown. The highest levels of the bottom of the launder are indicated at 53 with outlets 44 being positioned at the lowest point in the bottom of the launder.

In utilizing the separation cell shown in FIGS. 3 and 4 in a hot water extraction process for recovering bitumen from tar sands a bitumen froth product of improved flow characteristics is recovered. Specifically, tar sands pulp is fed to separation cell 50 via inlet 41. In the cell which is maintained full at a temperature of about 185° F. the tar sands separate into an upper bituminous froth layer, a mineral-water middlings layer and a lower sand tailings layer. The middlings layer can be withdrawn if desired through outlet 52 and sand tailings can be withdrawn via outlet 42. The upper froth layer overflows cell wall 40 into launder 43. The froth flows by gravity in launder 43 to launder exit means 44 located at the lowermost sections of the launder. While flowing through the launder the froth is contacted with steam provided via outlets 46 in the bottom of the launder to heat and deaerate the froth. Also the froth flow is retarded and agitated by the baffles disposed along the launder bottom providing improved deaeration of the froth subsequently recovered via outlets 44 for further processing.

As a practical matter the cell wall can be constructed so that is is highest where the outlets in the launder are located thereby inhibiting flow of froth over the cell wall adjacent to that part of the launder. In this manner no froth is transferred out of the extraction cell without being heated and deaerated to some degree. Also the cell wall adjacent to the highest point 53 in the bottom of 43 can be lower to facilitate a higher volume of froth flow at that point to thereby cause a larger amount of the froth to flow over at least a quarter segment of the launder to exit means 44.

The offset of the launder angle from the horizontal axis should be in the range of 5° to 45° to facilitate the proper rate of flow to provide sufficient contact time in the launder with steam to accomplish heating and deaeration of the froth. Baffles in the launder are positioned to regulate froth flow as desired. Also the number of steam inlets in the launder can be determined in accordance with the desired heating efficiency.

Thus, the present invention comprises an apparatus for transferring bituminous froth by gravity flow while concurrently heating and deaerating said froth comprising:

a. a conduit disposed at an angle of about 5° to 45° from the horizontal having an inlet means at the upper end thereof and an outlet means at the lower end thereof;

b. a plurality of steam injection means disposed intermittently along the bottom of said conduit between said inlet means and said outlet means for providing steam into said conduit; and c. a plurality of deflecting baffles disposed at intermittent points along the bottom of said conduit between said inlet and said outlet, said baffles each contacting only a part of the bottom of said conduit to provide an open channel along the bottom from the inlet to the outlet thereof.

In another aspect, the present invention comprises an improved hot water extraction separation cell suitable for use in recovering bitumen from tar sands comprising:

a. a tank having a bottom with an exit means therein;

b. an inlet means in the side of said tank for feeding tar sands to the tank;

c. an overflow launder positioned adjacent to the wall of said tank at the upper end thereof, said launder having a bottom disposed at an angle in the range of about 5° to 45° from the horizontal; said bottom having an outlet at the lowest point thereof and containing a plurality of steam inlet means for providing steam into said launder disposed along the bottom of said launder and containing a plurality of deflecting baffles disposed at intermittent intervals along the bottom of said launder.

The invention claimed is:

1. An apparatus for transferring bituminous froth by gravity flow while concurrently heating and deaerating said froth so that it can be more easily pumped, said apparatus comprising:

a. a conduit disposed at an angle of about 5° to 45° from the horizontal plane having an inlet means at the upper end thereof and an outlet means at the lower end thereof;

b. a plurality of steam injection means disposed intermittently along the bottom of said conduit between said inlet means and said outlet means for providing steam into said conduit; and c. a plurality of deflecting baffles disposed at intermittent points along the bottom of said conduit between said inlet and said outlet, each baffle being in contact with and extending over less than the whole of the width of the upper surface of the bottom of said conduit, thereby providing a continuous channel longer than, and generally along the length of, the conduit over the bottom thereof from said inlet to said outlet.

2. An improved hot water extraction separation cell suitable for use in recovering bitumen from tar sands comprising:

a. a tank having a bottom with an exit means therein;

b. an inlet means in the side of said tank for feeding tar sands to the tank;

c. an overflow launder positioned adjacent to the wall of said tank at the upper end thereof, said launder having a bottom disposed at an angle in the range of about 5° to 45° from the horizontal plane, said bottom having an outlet at the lowest point thereof and containing a plurality of steam inlet means disposed along the bottom of said launder for providing steam into said launder and containing a plurality of deflecting baffles disposed at intermittent intervals along the bottom of said launder, each baffle being in contact with and extending over less than the whole of the width of the upper surface of the bottom of said launder.

3. In a system for extracting bitumen from tar sands by the hot water process, said system including:

a. a primary separation cell for separating the bitumen from the sand wherein the bitumen floats to the upper liquid level in the cell in the form of a froth;

b. overflow launder means adjacent the top of the separation cell for receiving the bitumen froth;

c. means for further separating the bitumen from other impurities in the bitumen froth; and d. conduit means for providing fluid communication between overflow launder means and the means for further separating the bitumen;

an improvement for deaerating the bitumen froth so that its fluid flow and pumping characteristics are improved, said improvement comprising:

e. means for deflecting the flow of bitumen froth before it flows into the means for further separating the bitumen, so that the length of the flow path of bitumen froth is increased, and the flow directions are intermittently changed; and f. means, located in conjunction with the deflecting means, for injecting steam into the flow of bitumen froth.

4. The improvement recited in claim 3, wherein the overflow launder has a bottom disposed at an angle and an outlet connected to the conduit means at the lowermost portion of the bottom, and wherein the conduit means slopes downward from the outlet in the overflow launder, and wherein the deflecting means is located both in the overflow launder and the conduit means.

5. The improvement recited in claim 4, wherein the deflecting means located in the overflow launder comprises a plurality of baffles, disposed at intermittent points along at least part of the angled bottom of the overflow launder, each baffle being in contact with and extending over less than the whole of the width of the upper surface of the bottom of said overflow launder, thereby providing a continuous channel for bitumen froth to flow through which is longer than, and generally along the length of, the deflecting means in the launder, and wherein the deflecting means located in the conduit means comprises a plurality of baffles, disposed at intermittent points along at least part of the bottom of the conduit means, each baffle being in contact with and extending over less than the whole of the width of the upper surface of the bottom of said conduit means, thereby providing a continuous channel for bitumen froth to flow through, which is longer than, and generally along the length of, the deflecting means in the conduit means.

6. The improvement recited in claim 3, wherein the conduit means slopes downward from the overflow launder and wherein the deflecting means is located in the conduit means, so that the bitumen froth flowing from the overflow launder is subjected to the deflecting means and the steam injecting means to be deaerated and heated before it reaches the means for further separation of the bitumen.

7. The improvement recited in claim 6, wherein the deflecting means comprises a plurality of baffles, disposed at intermittent points along at least part of the bottom of the conduit means, each baffle being in contact with and extending over less than the whole of the width of the upper surface of the bottom of said conduit means, thereby providing a continuous channel for bitumen froth to flow through, which is longer than, and generally along the length of, the deflecting means in the conduit.

8. The improvement recited in claim 7, wherein the steam injection means comprises a plurality of steam outlet means located along the bottom of the conduit means.

9. The improvement recited in claim 3, wherein the overflow launder has a bottom surface disposed at an angle and an outlet connected to the conduit means at the lowermost point of the bottom of the launder, and wherein the deflecting means is located on the angled bottom of the overflow launder, so that the bitumen froth from the primary separation cell is subjected to the deflecting means and the steam injecting means to be deaerated and heated before it reaches the conduit means.

10. The improvement recited in claim 9, wherein the deflecting means comprises a plurality of baffles, disposed at intermittent points along at least part of the angled bottom of the overflow launder, each baffle being in contact with and extending over less than the whole of the width of the upper surface of the bottom of said overflow launder, thereby providing a continuous channel for bitumen froth to flow through which is longer than, and generally along the length of, the deflecting means in the launder.

11. The improvement recited in claim 10, wherein the steam injection means comprises a plurality of steam outlet means located along the bottom of overflow launder.

* * * * *